United States Patent
Mori

[11] Patent Number: 5,942,063
[45] Date of Patent: *Aug. 24, 1999

[54] METHOD OF MANUFACTURING MULTILAYER CERAMIC COMPONENT INCLUDING CAPACITOR

[75] Inventor: Haruhiko Mori, Takefu, Japan

[73] Assignee: Murata Manufacturing Co., Ltd., Japan

[*] Notice: This patent is subject to a terminal disclaimer.

[21] Appl. No.: 08/938,463

[22] Filed: Sep. 29, 1997

Related U.S. Application Data

[63] Continuation of application No. 08/533,868, Sep. 26, 1995, Pat. No. 5,753,060.

[30] Foreign Application Priority Data

Sep. 27, 1994 [JP] Japan .................................. 6-231826

[51] Int. Cl.⁶ .............................. B32B 31/26; B32B 31/12
[52] U.S. Cl. .................... 156/89.16; 156/64; 156/89.12; 156/89.14; 156/264; 264/615
[58] Field of Search ................................. 156/64, 89, 264, 156/277, 272.2, 89.12, 89.14, 89.16; 264/615; 29/25.03

[56] References Cited

U.S. PATENT DOCUMENTS

| | | |
|---|---|---|
| 4,698,192 | 10/1987 | Kuze et al. . |
| 4,752,857 | 6/1988 | Khoury et al. . |
| 4,771,520 | 9/1988 | Tanaka et al. . |
| 5,316,602 | 5/1994 | Kogame et al. ........................... 156/64 |
| 5,417,784 | 5/1995 | Kobayashi et al. ....................... 156/64 |
| 5,505,809 | 4/1996 | Yamamoto et al. ..................... 156/264 |
| 5,753,060 | 5/1998 | Mori ....................................... 156/64 X |

FOREIGN PATENT DOCUMENTS 1-250743  10/1989  Japan .

Primary Examiner—Curtis Mayes
Attorney, Agent, or Firm—Ostrolenk, Faber, Gerb & Soffen, LLP

[57] ABSTRACT

A method of preparing a multilayer ceramic component including capacitor therein includes the steps of carrying a long ceramic green sheet along its longitudinal direction and measuring the thickness thereof while carrying the same, forming an internal electrode on the long ceramic green sheet subjected to the measurement of the thickness, punching out the long ceramic green sheet provided with the internal electrode into prescribed dimensions and stacking the punched ceramic green sheets with each other by a number obtained on the basis of the measured value of the thickness for obtaining a laminate, obtaining a ceramic sintered body by firing the laminate.

6 Claims, 3 Drawing Sheets

METHOD OF MANUFACTURING MULTILAYER CERAMIC COMPONENT INCLUDING CAPACITOR

This is a continuation of application Ser. No. 08/533,868, filed Sep. 26, 1995 now U.S. Pat. No. 5,753,060.

BACKGROUND OF THE INVENTION

1. Field of the Invention

The present invention relates to a method of manufacturing a multilayer ceramic component including a capacitor, and more particularly, it relates to a process for a multilayer ceramic component including capacitor which enables acquisition of a desired electrostatic capacitance in high accuracy.

2. Description of the Background Art

In general, a multilayer ceramic capacitor is prepared through the following steps:

First, a ceramic green sheet is molded from a ceramic slurry. Then, conductive paste is applied onto the ceramic green sheet by a method such as screen printing, for forming an internal electrode. Then, a plurality of such ceramic green sheets provided with internal electrodes are stacked with each other and pressurized along the direction of thickness, to obtain a laminate. Then, the obtained laminate is fired to provide a ceramic sintered body, and thereafter external electrodes are formed on both end surfaces of the sintered body. FIG. 6 shows an exemplary multilayer capacitor 30 obtained in this manner.

As clearly understood from FIG. 6, a plurality of internal electrodes 32a to 32g are arranged in the multilayer ceramic capacitor 30 to overlap with each other through sintered body layers. The electrostatic capacitance of the multilayer ceramic capacitor 30 is decided by the thicknesses of the sintered body layers which are held between the internal electrodes 32a to 32g, overlapping areas of the internal electrodes 32a to 32g which are opposed to each other through the sintered body layers, and the dielectric constant of dielectric ceramics forming the sintered body layers.

In general, the sintered body layers which are held between the internal electrodes 32a to 32g have considerably small thicknesses of 5 $\mu$m to 50 $\mu$m. In the aforementioned method, therefore, slight fluctuation of the thicknesses of the ceramic green sheets results in remarkable fluctuation of the electrostatic capacitance. In order to implement a desired electrostatic capacitance in the multilayer ceramic capacitor, therefore, it is necessary to control the thicknesses of the employed ceramic green sheets in high accuracy.

In actual preparation of the multilayer ceramic capacitor, on the other hand, conductive patterns for forming the internal electrodes are provided on a mother green sheet, thereafter the mother ceramic green sheet which is provided with the conductive patterns is punched out into prescribed dimensions, and a plurality of the punched ceramic green sheets are stacked with each other to obtain a mother laminate, for improving mass productivity. Thereafter the mother laminate is cut along its thickness, thereby obtaining laminates for respective multilayer ceramic capacitors.

In general, the aforementioned ceramic green sheet is molded to have an elongated shape by a doctor blade coater or a roll coater method. In such a long ceramic green sheet molded in the aforementioned method, however, the thickness tends to disperse depending on the molding speed or the viscosity of the employed ceramic slurry, and partial dispersion of the thickness is not negligible.

When a multilayer ceramic capacitor is prepared in accordance with the conventional method, therefore, it is impossible to avoid dispersion of the electrostatic capacitance in the obtained ceramic green sheets. In order to prevent such dispersion of the electrostatic capacitance, therefore, the following method is employed in general:

After ceramic green sheets provided with internal electrodes for forming the electrostatic capacitance are stacked with each other, an additional ceramic green sheet for adjusting the electrostatic capacitance is further stacked on the laminate in consideration of the dispersion of the electrostatic capacitance which may be caused in the laminate, thereby implementing the necessary electrostatic capacitance.

In such a method of further stacking the additional ceramic green sheet provided with the electrode for adjusting the electrostatic capacitance, however, the preparation steps are complicated since the additional ceramic green sheet provided with an electrode for adjusting the electrostatic capacitance must be prepared, i.e., an electrode pattern for adjusting the electrostatic capacitance is required in addition to electrode patterns forming the internal electrodes.

In addition, the thicknesses of the ceramic green sheets may be considerably changed with time to result in thickness fluctuation of several $\mu$m. When a certain degree of time is required in advance of stacking after molding of the ceramic green sheets, therefore, it is necessary to change the laminate structure in response to the fluctuation of the thicknesses of the ceramic green sheets, in order to implement the target electrostatic capacitance. Thus, the method of forming the electrode pattern for adjusting the electrostatic capacitance still tends to cause an error between designed and actual electrostatic capacitances.

SUMMARY OF THE INVENTION

Accordingly, an object of the present invention is to provide a process for a multilayer ceramic component including a capacitor therein which can implement a desired electrostatic capacitance in high accuracy through relatively simple steps, with no requirement for complicated steps of preparing ceramic green sheets provided with conductive plates for adjusting the electrostatic capacitance and stacking such ceramic green sheets with each other.

According to a wide aspect of the present invention, provided is a method of manufacturing a multilayer ceramic component including a capacitor therein comprising the steps of carrying a long ceramic green sheet along its longitudinal direction and measuring the thickness of the long ceramic green sheet while carrying the same, forming an internal electrode on the long ceramic green sheet, punching out the long ceramic green sheet into ceramic green sheets of prescribed dimensions and stacking the punched ceramic green sheets with each other by a number obtained with reference to the measured value of the thickness of the long ceramic green sheet, pressurizing the stacked ceramic green sheets along the direction of thickness for forming a laminate, and obtaining a ceramic sintered body by firing the laminate.

In the method of manufacturing a multilayer ceramic component including a capacitor therein according to the present invention, the long ceramic green sheet is carried along its longitudinal direction so that the steps of measuring the thickness, forming an internal electrode and punching out the long ceramic green sheet are carried out, and the punched ceramic green sheets are immediately stacked with each other. Therefore, a laminate can be obtained with no influence exerted by fluctuation of the thicknesses of the ceramic green sheets caused with time.

After the actual thickness of the long ceramic green sheet is measured, the ceramic green sheets are stacked with each other by the number obtained in response to the value of the thickness, whereby a target electrostatic capacitance can be reliably implemented.

Even if the long ceramic green sheet disperses in thickness, therefore, it is possible to reliably prepare a multilayer ceramic component including a capacitor having the target electrostatic capacitance in high accuracy.

Preferably, the thickness of the long ceramic green sheet is measured in a plurality of portions, so that the number of the ceramic green sheets to be stacked with each other can be decided in higher accuracy. Thus, a multilayer ceramic component including a capacitor having a desired electrostatic capacitance can be further reliably prepared.

According to a specific aspect of the present invention, the thickness of the long ceramic green sheet is preferably measured at least at the center of a region which is provided with the internal electrode. More preferably, the thickness of the long ceramic green sheet is measured not only at the center but on positions of longitudinal ends or at corner portions of the region which is provided with the internal electrode. Thus, it is possible to decide the number of the ceramic green sheets to be stacked with each other on the basis of the thickness of the long ceramic green sheet at the central portion of the region provided with the internal electrode, which remarkably influences the electrostatic capacitance, by measuring the thickness at least at the center of the region provided with the internal electrode. When the thickness of the long ceramic green sheet is measured on the positions of the longitudinal ends or at the corner portions of the region which is provided with the internal electrode as described above, the number of the ceramic green sheets to be stacked with each other can be more correctly decided.

According to a certain preferred aspect of the present invention, the thickness of the long ceramic green sheet is measured by a non-contact measuring method. Thus, the thickness of the long ceramic green sheet can be readily and reliably measured without influencing the step of carrying the same. As to such a non-contact measuring method, a measuring method employing radiation can be employed, for example. In the measuring method employing radiation, the long ceramic green sheet is irradiated with the radiation so that its thickness can be decided from the amount of the applied radiation and the amount of excited or transmitted radiation which is obtained as the result of the irradiation. When the thickness of the long ceramic green sheet is measured through the radiation as described above, it is necessary to measure the thickness prior to formation of the internal electrode. Otherwise the thickness of the long ceramic green sheet cannot be correctly measured since the internal electrode contains a metal.

The method of deciding the number of the ceramic green sheets to be stacked with each other on the basis of the thickness of the long ceramic green sheet which is measured in the aforementioned manner can be preferably carried out by a central arithmetic processing unit which is connected to a thickness measuring unit for measuring the thickness of the long ceramic green sheet and generating an electric signal in response to the thickness. However, such an arithmetic processing unit may not be employed but the number of the ceramic green sheets to be stacked with each other can be immediately decided in response to the measured value of the thickness of the long ceramic green sheet by previously obtaining the relation between the thickness of the long ceramic green sheet and the number of the ceramic green sheets to be stacked with each other.

As hereinabove described, the method of preparing a multilayer ceramic component including a capacitor according to the present invention simply carries out the series of steps of measuring the thickness of the long ceramic green sheet, forming the internal electrode and punching out the long ceramic green sheet while carrying the long ceramic green sheet along its longitudinal direction, whereby the capacitor having a target electrostatic capacitance can be obtained in high accuracy without reducing working efficiency.

The number of the ceramic green sheets to be stacked with each other is set with reference to the thickness of the actually carried long ceramic green sheet, whereby dispersion in electrostatic capacitance can be remarkably reduced, and the desired electrostatic capacitance can be implemented in high accuracy. Consequently, it is possible to extremely reduce dispersion in electrostatic capacitance of the capacitor in the multilayer ceramic component.

Further, in a particular aspect of the present invention the multilayer ceramic component including a capacitor therein is a multilayer ceramic capacitor, wherein external electrodes are formed on end surfaces of the ceramic sintered body respectively.

The foregoing and other objects, features, aspects and advantages of the present invention will become more apparent from the following detailed description of the present invention when taken in conjunction with the accompanying figures.

DESCRIPTION OF THE PREFERRED EMBODIMENTS

Figure 1:
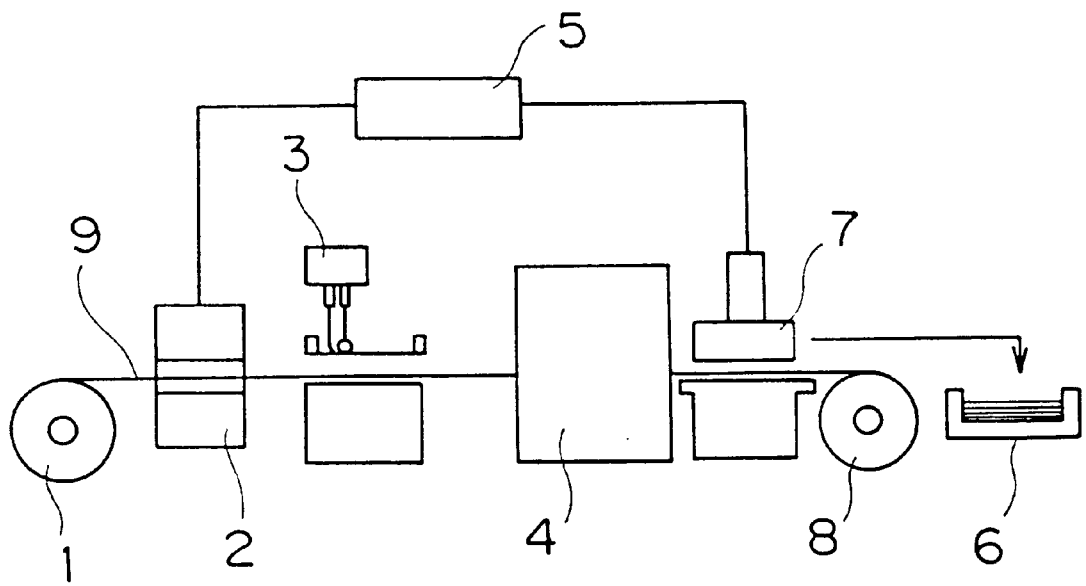
FIG. 1 is a schematic block diagram for illustrating preparation steps according to an embodiment of the present invention.

FIG. 1 is a schematic block diagram for illustrating an essential part of a method of preparing a multilayer ceramic capacitor according to an embodiment of the present invention.

Referring to FIG. 1, a molded long ceramic green sheet 9 is fed from a roll 1 toward a take-up roll 8. The ceramic green sheet 9 is wound on the roll 1.

The long ceramic green sheet 9 is delivered from the roll 1 and carried toward the roll 8, while a sheet thickness measuring unit 2, an internal electrode printer 3, a drying furnace 4 and a sheet punching unit 7 are arranged between the rolls 1 and 8. The sheet punching unit 7 punches out the long ceramic green sheet 9 into ceramic green sheets of prescribed dimensions, so that the punched ceramic green sheets are stacked with each other in a mold 6. After the ceramic green sheets of the prescribed dimensions are punched out, the remaining part of the long ceramic green sheet 9 is taken up on the roll 8. The sheet thickness measuring unit 2 and the sheet punching unit 7 are electrically connected with each other through a central arithmetic processing unit 5.

The method of preparing a multilayer ceramic capacitor according to this embodiment is now described in more concrete terms.

First, the long ceramic green sheet 9 is wound on the roll 1. The long ceramic green sheet 9 is molded by a doctor blade coater, a roll coater method or another method, similarly to the prior art. The long ceramic green sheet 9 may alternatively be formed on a base film of PET (polyethylene terephthalate) or the like.

The long ceramic green sheet 9 is carried along its longitudinal direction, and supplied to the sheet thickness measuring unit 2. The sheet thickness measuring unit 2 according to this embodiment is adapted to irradiate the long ceramic green sheet 9 with radiation for measuring the thickness of the long ceramic green sheet 9 from the ratio of the amount of the applied radiation to the amount of excited or transmitted radiation which is obtained as the result of the irradiation. This sheet thickness measuring unit 2 measures the thickness of the long ceramic green sheet 9. The measured value is supplied to the central arithmetic processing unit 5 as described later for deciding the number of the ceramic green sheets to be stacked with each other, and the sheet punching unit 7 is controlled to punch out the long ceramic green sheet 9 into the ceramic green sheets of the prescribed dimensions, which in turn are stacked with each other.

The sheet thickness measuring unit 2 may alternatively be formed by any unit in place of that employing radiation, so far as the same can measure the thickness of the long ceramic green sheet 9 while carrying the same, without extracting a part thereof. For example, the unit 2 may be formed by a micrometer which presses measurers against both surfaces of the long ceramic green sheet 9 for measuring its thickness.

The long ceramic green sheet 9 is preferably intermittently fed between the rolls 1 and 8, so that its thickness is measured while the same is stopped. Internal electrodes can be formed on the long ceramic green sheet 9 during such stoppage, as described later. Thus, the thickness of the long ceramic green sheet 9 can be measured every formation of the internal electrodes, whereby the time for carrying out the steps can be prevented from being increased by provision of an extra time for measuring the thickness.

The radiation which is employed for measuring the thickness is selected from X-radiation, γ-radiation and β-radiation, in response to the material for and the thickness of the long ceramic green sheet 9. Particularly when the long ceramic green sheet 9 is formed on a base film, the radiation is preferably prepared from the X-radiation or the γ-radiation which is hardly influenced by the material for the base film etc.

Thereafter the long ceramic green sheet 9 which is subjected to the measurement of its thickness is fed to the next step of forming the internal electrodes, so that the internal electrode printer 3 applies conductive paste 10 onto the long ceramic green sheet 9 by screen printing. Thus, the conductive paste 10 is printed onto the long ceramic green sheet 9 in a prescribed pattern (see FIG. 2).

Then, the long ceramic green sheet 9 which is coated with the conductive paste 10 is introduced into and dried in the drying furnace 4. Drying conditions, which are varied with the type of a solvent employed for the conductive paste 10, are properly set in the ranges of about 70 to 150° C. and 30 sec. to 10 minutes, in general.

Thereafter the long ceramic green sheet 9 which is provided with the internal electrodes is punched out into prescribed dimensions by the sheet punching unit 7 along the portions provided with the internal electrodes. When the long ceramic green sheet 9 is formed on a base film, only the long ceramic green sheet 9 may be punched out. Thereafter the punched ceramic green sheets are vacuum-sucked by a suction head of the sheet punching unit 7, for example, moved along arrow in FIG. 1, and stacked with each other in the mold 6. The remaining part of the long ceramic green sheet 9 is taken up on the roll 8.

The step of punching out the long ceramic green sheet 9 and stacking the punched ceramic green sheets with each other is carried out by punching out the long ceramic green sheet 9 into sheets of prescribed dimensions by a number which is decided in the central arithmetic processing unit 5, and stacking the punched sheets with each other. Thus, a desired capacitance can be acquired in high accuracy.

Assuming that the average thickness of the long ceramic green sheet 9 is increased to 11.0 μm by 1 μm with respect to a desired thickness of 10.0 μm, the acquired capacitance is reduced by about 10%. In this case, the number of the ceramic green sheets, which is provided with the internal electrodes, to be stacked with each other may be increased by 10% for increasing the overlapping areas of the internal electrodes holding dielectric ceramic layers by 10%, in order to acquire the desired capacitance in high accuracy.

In order to further accurately acquire the desired capacitance, capacitance correction may be carried out by partially changing the overlapping areas of the internal electrodes holding the dielectric ceramic layers of the multilayer capacitor. Such capacitance correction of changing the overlapping areas is carried out by punching out the long ceramic green sheet 9 provided with the internal electrodes in slight displacement from normal positions and stacking the punched ceramic green sheets with each other thereby changing the overlapping areas of the internal electrodes holding the dielectric ceramic layers.

Figure 3:
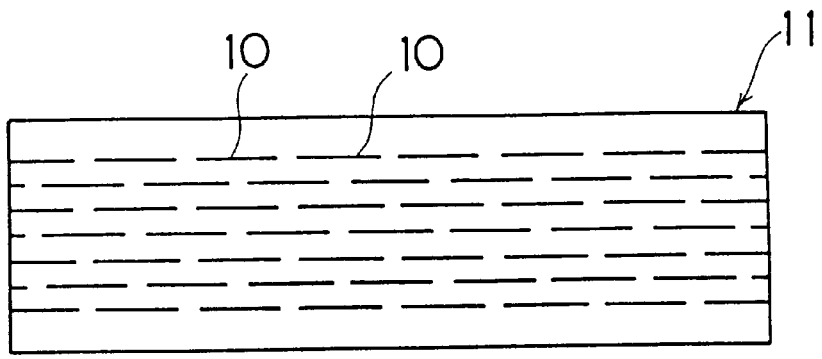
FIG. 3 is a sectional view showing a mother laminate formed by stacking ceramic green sheets on which internal electrodes are printed with each other.
Figure 4:
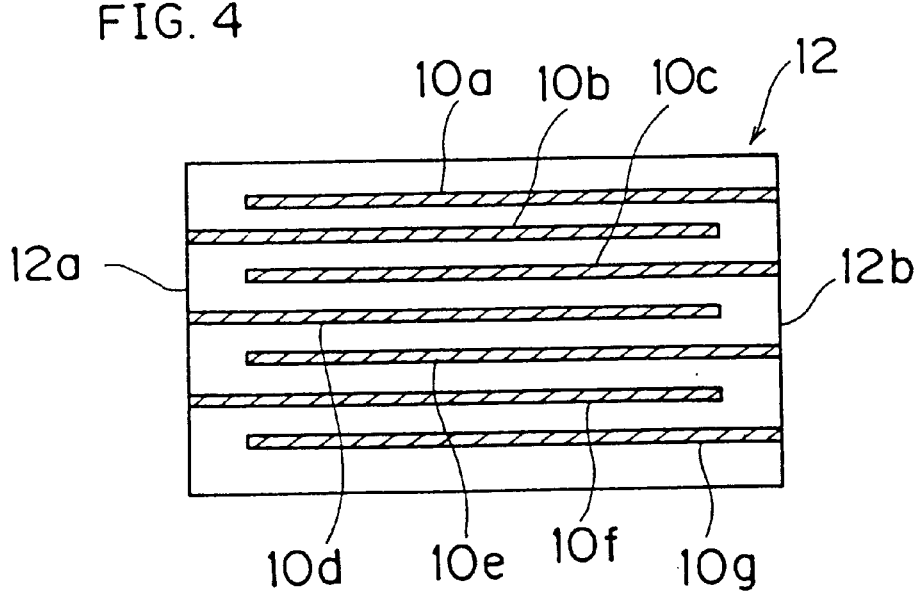
FIG. 4 is a sectional view showing a ceramic sintered body for an independent multilayer capacitor.
Figure 5:
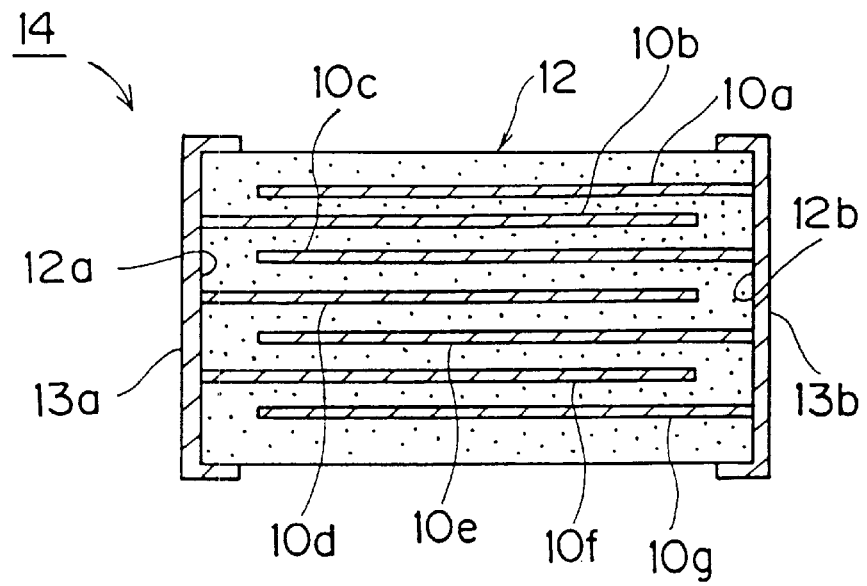
FIG. 5 is a sectional view showing a multilayer capacitor obtained according to the embodiment of the present invention.
Figure 6:
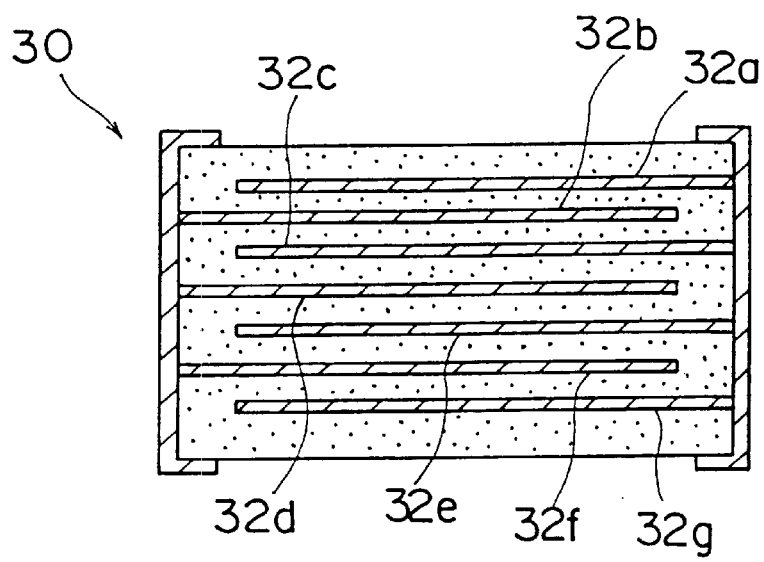
FIG. 6 is a sectional view for illustrating a conventional multilayer capacitor.

Thereafter the stacked ceramic green sheets, which are provided with a number of internal electrodes in general, are pressurized along the direction of thickness, to obtain a mother laminate 11 shown in FIG. 3. Then, the mother laminate 11 is cut along its thickness, to obtain laminates for independent multilayer ceramic capacitors. Each laminate is fired to obtain a ceramic sintered body 12 shown in FIG. 4. In this sintered body 12, internal electrodes 10a to 10g are formed by baking of the conductive paste 10. Further, external electrodes 13a and 13b shown in FIG. 5 are formed on end surfaces 12a and 12b of the sintered body 12 by application and baking of conductive paste and/or plating. A multilayer ceramic capacitor 14 obtained in the aforementioned manner can acquire a desired capacitance in high accuracy.

While the thickness of the long ceramic green sheet is measured before printing of the internal electrodes in the aforementioned embodiment, measurement accuracy can be preferably improved by necessarily carrying out the measurement before every printing of the internal electrodes. If the long ceramic green sheet less disperses in thickness, however, its thickness may be measured once every two or three times of printing. The number of times for measuring the thickness of the long ceramic green sheet can be reduced in this case.

Figure 2:
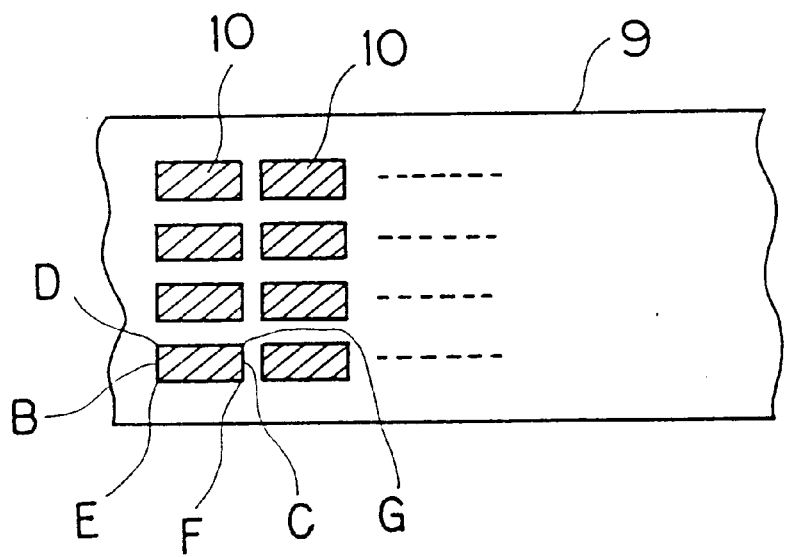
FIG. 2 is a partially fragmented plan view showing a ceramic green sheet on which internal electrodes are printed.

While the thickness of the long ceramic green sheet can be measured in an arbitrary position, the same is preferably measured at a central portion of the region provided with the internal electrodes shown by arrow A in FIG. 2. The thickness of the long ceramic green sheet is preferably measured at the central portion A of the region provided with the internal electrodes, so that the thickness can be measured in high accuracy in the region provided with the internal electrodes which remarkably influence the electrostatic capacitance.

In addition to the central portion A of the region provided with the internal electrodes, the thickness is preferably measured on positions of both longitudinal ends of the region provided with the internal electrodes as shown by arrows B and C in FIG. 2, or at corner portions D to G thereof. The number of the positions for measuring the thickness of the long ceramic green sheet is preferably increased so that the thickness can be measured in high accuracy. In order to simplify the operation for calculating the number of the ceramic green sheets to be stacked with each other with reference to the thickness, however, the number of the measuring positions is preferably reduced.

When the thickness of the long ceramic green sheet is measured through radiation as described above, the thickness must be measured in advance of printing of the internal electrodes, since the internal electrodes contain a metal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a multilayer ceramic component including internal capacitor electrodes therein, comprising the steps of:
   (a) carrying a long ceramic green sheet along its longitudinal direction;
   (b) forming a plurality of internal capacitor electrodes on said long ceramic green sheet;
   (c) measuring the thickness of said long ceramic green sheet in a plurality of portions thereof while carrying the same, said measuring being performed prior to or after step (b);
   (d) punching out said long ceramic green sheet into ceramic green sheets of prescribed dimensions and having said internal capacitor electrodes thereon and stacking a number of said punched ceramic green sheets with each other, said number being selected with reference to the measured value of the thickness of said long ceramic green sheet;
   (e) pressurizing said stacked ceramic green sheets along the direction of thickness for forming a laminate; and
   (f) obtaining a ceramic sintered body by firing said laminate.

2. The method of manufacturing a multilayer ceramic component including internal capacitor electrodes therein in accordance with claim 1, wherein the thickness of said long ceramic green sheet is measured by a non-contact measuring method.

3. The method of manufacturing a multilayer ceramic component including internal capacitor electrodes therein in accordance with claim 2, wherein said non-contact measuring method is performed before step (b) and includes the steps of irradiating said long ceramic green sheet with radiation and measuring the thickness on the basis of the amount of said applied radiation and an amount of excited or transmitted radiation being measured after irradiation.

4. The method of manufacturing a multilayer ceramic component including internal ,capacitor electrodes therein in accordance with claim 3, wherein the multilayer ceramic component including internal capacitor electrodes therein is a multilayer ceramic capacitor and further comprising the step of forming external electrodes conductively connected to selected ones of said internal electrodes on end surfaces of said ceramic sintered body, respectively.

5. The method of manufacturing a multilayer ceramic component including internal capacitor electrodes therein in accordance with claim 2, wherein the multilayer ceramic component including internal capacitor electrodes therein is a multilayer ceramic capacitor and further comprising the step of forming external electrodes conductively connected to selected ones of said internal electrodes on end surfaces of said ceramic sintered body, respectively.

6. The method of manufacturing a multilayer ceramic component including internal capacitor electrodes therein in accordance with claim 1, wherein the multilayer ceramic component including internal capacitor electrodes therein is a multilayer ceramic capacitor and further comprising the step of forming external electrodes conductively connected to selected ones of said internal electrodes on end surfaces of said ceramic sintered body, respectively.

* * * * *